United States Patent Office 3,037,001
Patented May 29, 1962

3,037,001
PRODUCTION OF DILACTAMS AND OF POLY-
AMIDES CAPABLE OF BEING PREPARED
THEREFROM
Friedrich Becke, Bad Duerkheim, and Kurt Wick, Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed Feb. 15, 1957, Ser. No. 640,313
Claims priority, application Germany Mar. 6, 1956
7 Claims. (Cl. 260—78)

This invention relates to a method for the production of hitherto unknown dilactams and new polyamides capable of being prepared therefrom. In particular it relates to a method for the production of new dilactams in which in each lactam ring the lactam group is in adjacent position to the carbon atoms linking the lactam rings by way of a bridge member. Furthermore, it relates to the reaction of these dilactams as such or in admixture with linear polyamides or compounds forming the same, to form new, extremely valuable polyamides suitable for the production of fibres, films, sheetings, tubes, pipes and plastic synthetic substances.

It is already known to prepare monolactams by rearrangement of mono-oximes according to methods discovered by Beckmann. It is also known that dilactams are obtained by treating with hydrazoic acid, bicyclic ring ketones which may if desired be connected in 4-position by alkylene groups. By this process, which for various reasons has not found application in practice, dilactams are obtained in which the imino groups and also the carbonyl groups are separated from the C-atoms linking the two lactam rings each by two methylene groups in each ring.

The primary object of the present invention is a process according to which in a simple manner new, valuable dilactams are obtained which in their constitution, in particular in the position of the lactam groups to the points of linkage of the lactam rings, differ from the known dilactams and which are suitable in a special degree for the production of polyamides.

A further object of the invention consists in the use of readily accessible initial materials and the conversion of the same to dilactams in a way which is easily carried out technically. Yet another object of the invention consists in providing new dilactams which when polycondensed alone or with linear polyamides or with compounds forming linear polyamides yield new polyamides with improved and specially valuable properties.

An essential object of the invention therefore consists in the provision of new, especially useful polyamides of high practical value from the primarily prepared dilactams of the invention.

We have now found that dilactams of the general formula

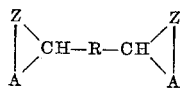

in which R is a divalent radical selected from the group consisting of

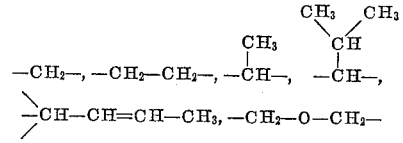

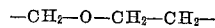

and

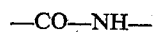

Z represents the grouping —NH—CO— or
—CO—NH— and A is a saturated divalent aliphatic radical from the group consisting of

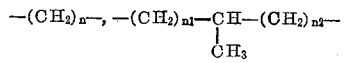

and

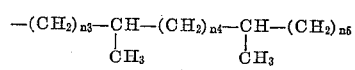

$n$ being a whole number between 1 and 6, $n1$ and $n2$ being whole numbers between 0 and 5 but $(n1+n2)$ not being more than 5, and $n3$, $n4$ and $n5$ being whole numbers between 0 and 4 but the sum $(n3+n4+n5)$ not being more than 4, are obtained by treating dioximes of the general formula

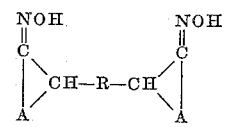

in which R and A have the significance given above, with substances already known to be suitable for the Beckmann rearrangement.

The dioximes coming into question as initial materials are readily obtained for example by the action of hydroxylamine compounds on bicyclic ring ketones. Suitable ring ketones (for the production and reaction with hydroxylamines of which is not claimed within the scope of the present invention) are those in which two molecules of tri- and poly-membered cyclic ketones are connected in adjacent position to the keto groups by an open-chain bridge member which may be saturated or unsaturated, if desired branched, and may contain also hetero atoms, as for example oxygen.

Especially suitable dioximes are for example methylene-bis-(cyclopropanone-oxime), methylene-bis-(cyclobutanone-oxime), methylene - bis - (cyclopentanone-oxime), methylene - bis - (cyclohexanone - oxime), methylene-bis-(cycloheptanone-oxime), methylene-bis-(cyclo-octanone-oxime) and methylene-bis-(methylcyclohexanone-oxime).

They may be obtained for example by the reaction of hydroxylamine compounds with the reaction products of cycloalkyl ketones with formaldehyde or compounds reacting like formaldehyde. There are also suitable above all dioximes such as 1.1'-di-[cyclohexanone-oxime-(2)]-dimethylether, alpha.beta-di-[cyclohexanone-oxime-(2)]-methylethylether and the corresponding compounds with other radicals of cycloaliphatic ring ketones. Further suitable compounds are the ketoximes of 1.1- or 1.2-di-(2'-ketocyclohexyl)-ethane, 1.1-di-(2'-ketocyclo-octyl)-ethane, 1.1-di-(2'-ketocyclohexyl)-isobutane and 1.1-di-(2'-ketocyclohexyl)-butene-(2).

The rearrangement of the dioximes can be effected in the usual way with the strongly acid-reacting agents already known for the Beckmann rearrangement. Such substances having a rearranging action are for example inorganic or organic acids or their halides, as for example sulfuric acid, oleum, chlorsulfonic acid, perchloric acid, hydrofluoric acid, phosphorus pentachloride, phosphorus oxychloride, antimony chloride, acetyl chloride or benzene sulfonyl chloride and boron trifluoride. The treatment may be carried out at reduced, ordinary or increased temperature, preferably at temperatures between about 60° C. and 220° C., advantageously at about 60° C. to 160° C.

The amount of the substance effecting the rearrangement may be varied within wide limits and in general amounts to about 0.2 to 10 parts by weight, especially 1 to 4 parts by weight, for each part by weight of dioxime used.

In order to moderate the reaction, which proceeds with strong development of heat and sometimes violently, it is preferable to lead away the excess reaction heat by cooling. It is especially advantageous to carry out the rearrangement in the presence of solvents or diluents, and then the large amount of heat in the reaction mixture can be withdrawn by vaporization of the solvent or diluent. The solvent or diluent recovered by condensation can either be returned to the reaction vessel or used for the extraction or suspension of further amounts of dioxime to be rearranged.

The compounds to be rearranged may themselves act as solvents or diluents, or addition solvents or diluents may be used, for example ethers, hydrocarbons such as cyclohexane, methylcyclohexane, dimethylcyclohexane, hexane, heptane, octane and nonane, or also halogenated hydrocarbons, such as chloroform, methylene chloride, carbon tetrachloride and nitrohydrocarbons, such as nitrobenzene and nitromethane, or also mixtures of such liquids.

The rearrangement may be carried out batchwise or continuously. When working continuously, the dioxime may be led for example together with the rearranging substances through a reaction zone in which they are heated for the purpose of rapid rearrangement. It is especially advantageous, especially when working on a large technical scale, to suspend the dioxime in a diluent and to introduce the suspension into sulfuric acid at temperatures of about 40° C. to 90° C., the sulfuric acid solution then being heated to a temperature especially favorable for the rearrangement, as for example above about 100° C.

The working up of the reaction mixture takes place in known manner. For example the reaction mixture may be neutralized with alkaline substances, such as sodium carbonate, alkali hydroxides or ammonia, the inorganic salts formed separated, for example filtered off, and the filtrate evaporated, preferably after completely desalting the same with the aid of ion-exchange agents. The reaction mixture after neutralization may also be extracted with solvents, for example with chloroform, methylene chloride or diethyl ether, without separating the precipitated mineral salts. The dilactams may then be precipitated from the extracts with solvents, as for example benzene, ethyl acetate or acetone, or recovered by distilling off the extraction agent. The crude dilactams may if desired be further purified by redissolution and precipitation or by recrystallization, preferably after a treatement with active carbon or other adsorption agents, as for example aluminium oxide or earths, such as fuller's earth, Florida earth and bentonites.

The dilactams obtained are in general not of uniform structure but consist of mixtures of different isomeric dilactams which differ by the relative positions of the members of the lactam group, i.e. the grouping —NH—CO— or —CO—NH—, to the bridging member, by which is to be understood the divalent radical R, of the above-mentioned significance, which connects the two rings.

For example in dilactams which have been obtained for example by the rearrangement of methylene-bis-cyclohexanone-oxime-(2), the following methylene-bis-caprolactams may be contained in the mixture:

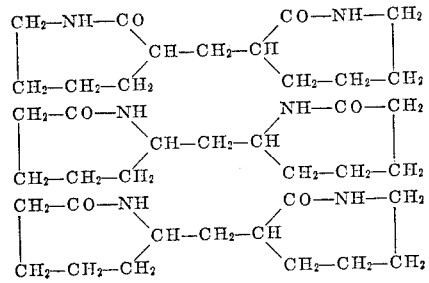

The dilactams obtainable according to this invention in the manner described above yield, by polycondensation alone or in admixture with linear polyamides or with compounds forming linear polyamides, new polyamides having a partly cross-linked molecular structure which are suitable to a special extent for the production of fibers, films, sheetings, tubes, pipes and other shaped articles.

In the production of mixed polyamides it is advantageous to add the dilactams to be used according to this invention to the substances forming linear polyamides prior to the polycondensation, but the addition can also take place during the condensation of the substances forming linear polyamides. The term "substances forming linear polyamides" includes mixtures of aliphatic diamines, advantageously those having 2 to 12 carbon atoms in the molecule, and aliphatic dicarboxylic acids with 4 to 20 carbon atoms in the molecule, as well as compounds which are obtained by reaction of such diamines with dicarboxylic acids or contain in the molecule both at least one amino group and also at least one carboxylic group or carboalkoxy group or at least one lactam group. Mixtures of the said substances are also included within the terms "substances forming linear polyamides."

Suitable substances forming linear polyamides are for example the adipic acid salt of hexamethylene diamine (hexamethylene diamine adipate), suberic acid salt of hexamethylene diamine, adipic acid salt of octamethylene diamine, sebacic acid salt of hexamethylene diamine, adipic acid salt of diaminodicyclohexylmethane, omega-aminocaproic acid, the hydrochloride of omega-aminocaproic acid, acetylaminocaproic acid, omega-amino-oenanthic acid, omega-amino-undecanic acid, pyrrolidone, epsilon-caprolactam, oenanthic lactam, caprylic lactam, and mixtures of two or more of such compounds.

It is also possible, however, to add the dilactams to the linear polyamides themselves and subsequently to condense into the same the linear polyamides obtained for example from epsilon-caprolactam or caprylic lactam or from adipic acid hexamethylene diamine or from mixtures of adipic acid hexamethylene diamine and caprolactam.

The amount of the dilactams to be added according to this invention depends on the desired properties and processing of the final polyamides exhibiting a partly cross-linked structure. For example if the working up is to be carried out from the melt, additions of a fraction of one percent up to a few percent, for example from about 0.05% by weight to 5% by weight, with reference to the final polyamide, are suitable. When working up by pressing, kneading or sintering methods, not only may these small amounts be used but also larger amounts of dilactam, as for example about 5% by weight to 90% by weight with reference to the final polyamide, and if desired a condensing-in may be effected by annealing at 100° C. to 300° C. before or during the working up.

The condensation itself may take place in the usual way, for example by heating to temperatures of about 120° C. to 300° C. under atmospheric pressure, reduced pressure or increased pressures up to about 20 atmospheres with or without the addition of water. The addition of conventional softeners, such as hydroxybenzoic acid esters, benzene sulfonic acid monomethylamide, dibenzylphenol, resorcinol phosphate or iso-dodecyl phenol during the polycondensation is especially advantageous when the resultant mixed polyamide is to be worked up into foils, flexible threads or pliable tubes and plates.

In some cases the addition of catalysts, for example water, benzoic acid, epsilon-aminocaproic acid, epsilon-aminocaproic acid hydrochloride, adipic acid salt of hexamethylene diamine, alkali hydroxides, alkali amides or alkali or alkaline earth metals, and of stabilizers is advantageous. It is then preferable to add the catalyst in amounts of 0.5 to 50% by weight with reference to the polyamide-forming substance, whereas the stabilizers, for example adipic acid, acetic acid or stannous chloride, are used in small amounts of for example about 0.05 to 2% by weight. The condensation, which may be carried out continuously or discontinuously, may if desired be carried out in the presence of solvents or diluents. As such there may be used water, polyhydric alcohols, phenols, cresols, xylenols, butylphenol, hydroxydiphenyl and the like.

The subsequent cross-linking of the linear polyamides by condensing-in the dilactams may be carried out for example by working the finished polyamides together with the said dilactams in mixers or kneaders at temperatures slightly below the melting temperature of the polyamides. Mixtures of granular or pulverulent polyamides with the said dilactams may also be compressed under high pressure, for example 3000 to 6000 atmospheres, and the condensing-in effected by annealing at temperatures below the melting temperature of the polyamide.

By polycondensation of the said dilactams alone, completely transparent, horny-elastic polyamides with valuable properties are obtained.

The polycondensation of the dilactams may be carried out in moulds for the shaped articles to be prepared, the latter thus being produced directly by the polycondensation. Preforms may also be prepared in this way and the final shaped articles prepared therefrom by shaping by cutting or by pressing at elevated temperatures.

The mixed polycondensates obtained, especially those with a minor proportion of dilactams, are distinguished in general by increased melting range and increased molten viscosity. They may therefore be worked up directly on the usual screw press extrusion and injection molding machines, presses and kneaders. Thus for example hoses, tubes, bands, rods and injection moldings can thus be prepared. It is just as easy to make threads, foils and plates. The articles thus prepared have high thermal elasticity. The considerably increased adhesion effect of the polyamides obtained to a great variety of materials, such as glass, metal, paper, rubber as well as fibrous materials and woven goods therefrom is significant for many technical purposes.

Of quite special technical importance, especially for the production of plates, bands, foils and filamentary material, is the increased wet breaking strength and splinter resistance of the polyamides prepared according to this invention. This increase is effected even by small amounts, for example 1% to 3%, of the said dilactams. Thus for example a thread loop 2 millimeters thick of a polyamide which has been prepared from 60 parts of adipic acid hexamethylene diamine and 40 parts of epsilon-capro-lactam with an addition of 2 parts of methylene-bis-(capro-lactam), when introduced into water at 60° C., remains unchanged whereas a thread loop of the same size which has been prepared under the same conditions but without the addition of the said dilactam, immediately breaks under the said treatment. Bands, foils and plates exhibit exactly similar behaviour.

With larger added amounts, the molten viscosity is increased so that the polycondensates obtained can only be forced out from the condensation vessel with difficulty or not at all. In this case the condensation is preferably carried out in the presence of inert diluents, as for example polyhydric alcohols, which are capable of being washed out well from the finished condensates. It is also possible, however, to work in vessels which permit the removal of gummy-viscous masses. If desired the polycondensation can be carried out in vessels which impart to the polyamide at the same time its final shape.

The following examples will further illustrate this invention but the invention is not restricted to these examples. The parts specified in the examples are parts by weight.

*Example 1*

200 grams of methylene-bis-cyclohexanone oxide are dissolved in 20 gram portions each in 40 ccs. of 85% sulfuric acid by stirring and gentle heating in a large vessel. By moderate further heating the rearrangement is accomplished at temperatures of about 100° C. The whole is then allowed to cool. The combined acid solutions are neutralized at about 10° C. with 15% aqueous ammonia solution and the solution shaken with chloroform. The extract is dried. The solvent is distilled off, reduced pressure being used towards the end of the distillation. The syrup remaining is boiled up in 400 ccs. of ethyl acetate. Upon cooling, a powder of beige appearance separates. It is filtered off by suction, washed with ethyl acetate and dried at 75° C. The yield of crude methylene-bis-caprolactam amounts to 156 grams, corresponding to a yield of 78% of the theoretical yield.

100 grams of the crude dilactam are dissolved in 1 litre of methanol. The brown solution is filtered through aluminium oxide and then boiled up with active carbon. After filtration, a completely colorless solution is obtained. The solvent is distilled off and 95 grams of methylene-bis-caprolactam are obtained. The product is entirely colorless and finely crystalline. It dissolves well in methanol, ethanol, water and chloroform and is difficultly soluble in benzene, ether and gasoline. When heated dry, it begins to sublime at about 150° C. When heated rapidly, it begins to melt at 175° C. and has completely melted through at 200° C. The melt is colorless.

*Example 2*

200 grams of the dioxime of 1.1'-di-(2-ketocyclohexyl)-dimethyl ether of the melting point 195° C. are dissolved in 10 gram portions each in 35 grams of 95% sulfuric acid with mechanical agitation and slight heating. The rearrangement is accomplished by further moderate heating at temperatures of about 100° C. The combined acid solutions are neutralized at about 10° C. with 15% aqueous ammonia solution and the resultant solution extracted with chloroform. Upon evaporating the solvent, a crystal cake is left behind which is boiled up with 250 grams of acetone for purification. After cooling, it is filtered by suction, washed with acetone and dried at 65° C. 130 grams of pale beige-colored dilactam are obtained, i.e. 65% of the theoretical yield. For further purification, 100 grams of this dilactam are dissolved in 800 grams of ethanol, filtered through aluminium oxide and boiled up with active carbon. After filtration, the solution is colorless. The solvent is evaporated and 90 grams of completely colorless dilactam are obtained. It dissolves readily in methanol, ethanol, chloroform and with difficulty in water, benzene and acetone. It melts in the range between 145° and 170° C.

*Example 3*

200 parts of 98% sulfuric acid and 1500 parts of chloroform are heated in a reaction vessel while stirring well until the chloroform boils. The chloroform vapor serves for heating an extractor in the jacket of which are situated 100 parts of methylene-bis-(cyclohexanone-oxime), and is condensed in a condenser above the extraction jacket. The condensed chloroform flows back into the reaction vessel through the dioxime. The total amount of the dioxime is introduced into the sulfuric acid by extraction within 6 hours. The mixture is kept boiling for another two hours. Without separating the chloroform, the rearrangement solution can be worked up as described in Example 1 after cooling. The yield of crude dilactam, which is already very pure, is 70%.

*Example 4*

A suspension of 100 parts of methylene-bis-(cyclohexanone-oxime) in 600 parts of chloroform is allowed to flow into a well-stirred mixture of 200 parts of 100% sulfuric acid and 600 parts of chloroform which has been preheated to 60° C., the introduction being effected in such manner that the chloroform in the mixture remains boiling continuously. When all the dioxime has been dissolved, the chloroform is removed from the sulfuric acid layer. The sulfuric acid solution is heated for a short time at 160° C. The rearrangement solution formed is worked up as described in Example 1. The yield of crude methylene-bis-caprolactam amounts to 84%. The content of methylene-bis-caprolactam in the crude product amounts to 98%.

*Example 5*

A suspension of 100 parts of methylene-bis-(cyclohexanone-oxime) in 250 parts of dimethylcyclohexane are allowed to flow into a mixture, preheated to 100° C. of 220 parts of 96% sulfuric acid and 500 parts of dimethylcyclohexane while stirring well that the dimethylcyclohexane in the mixture boils and remains boiling. When all the dioxime has been introduced, the whole is heated for a further 30 minutes to keep the solvent boiling. Then the sulfuric acid layer is separated and worked up as described in Example 1. The yield of methylene-bis-caprolactam amounts to 82%. The product has a degree of purity of 98.4%.

*Example 6*

Into a vessel which contains 1000 parts of cyclohexane and 100 parts of 100% sulfuric acid, methylene-bis-(cyclohexanone-oxime) is introduced with the aid of cyclohexane in such a manner that the cyclohexane in the reaction vessel remains boiling. The vaporizing cyclohexane is condensed and used for introducing the dioxime. The sulfuric acid solution is continuously withdrawn from a quiescent zone of the vessel in which the cyclohexane separates by the formation of layers. The solution is led through a second reaction vessel in which it is kept at 110° C. in all for 30 minutes. At the same time there is continuously introduced into the first reaction vessel such an amount of sulfuric acid that the original amount is kept constant. The introduction of the dioxime, the supply of fresh sulfuric acid and the withdrawal of the sulfuric acid solution are so correlated that there are always about 100 parts of dioxime to 180 parts of sulfuric acid contained in the effluent solution. After passing through the second reaction vessel, the sulfuric acid solution flows through a cooler and then through a neutralization vessel where it is continuously neutralized with ammonia while cooling. The further working up takes place in the manner described in Example 1. The dilactam is obtained in a good purity (99.3%) and in a yield of 91%.

*Example 7*

1000 parts of epsilon-caprolactum, 670 parts of water and 10 parts of methylene-bis-(caprolactam) obtained by Beckmann rearrangement from methylene-bis-(cyclohexanone-oxime) are heated to 275° C. in a stainless steel pressure vessel in an atmosphere free from oxygen. The pressure is kept constantly at 18 atmospheres by decompression. As soon as the temperature of 275° C. has been reached, the whole is slowly decompressed to atmospheric pressure and the condensation completed by heating to the same temperature for 3 hours. The melt is pressed out into a cooling bath. The polyamide obtained may be directly spun into wires, threads or band-shaped structures which can be normally stretched. The waterproofness is improved as compared with polyamides without additions. The adhesion to various materials is very greatly increased.

If 15 or 20 parts of methylene-bis-(caprolactam) are used instead of 10 parts, the waterproofness is further considerably increased. The softening range is widened.

*Example 8*

100 parts of epsilon-caprolactam, 10 parts of methylene-bis-(caprolactam), and 2 parts of adipic acid salt of hexamethylene diamine are heated for 6 hours at 270° C. in an atmosphere free from oxygen in a glass or stainless steel vessel. The polyamide formed may be pressed or rolled while hot and worked up by cutting. Other catalysts, such as inorganic or organic acids, may be used instead of adipic acid hexamethylene diamine.

*Example 9*

100 parts of the methylene-bis-(caprolactam) specified in Example 7 are heated to 270° C. for 6 hours in an atmosphere free from oxygen. After cooling, a completely transparent horny-viscous polycondensate is obtained which is infusible but becomes rubber-elastic upon being heated. It may be worked up by cutting operations without smearing like linear polyamides.

*Example 10*

600 parts of adipic acid salt of hexamethylene diamine, 400 parts of epsilon-caprolactam, 670 parts of water and 10 parts of the methylene-bis-(caprolactam) specified in Example 7 are polycondensed in the manner described in Example 7. The resultant polyamide may be spun into threads, wires or bands. The wet breaking strength and splinter resistance of this product are considerably increased as compared with the mixed polyamide from only adipic acid hexamethylene diamine and caprolactam. They are still further considerably increased by adding 15 or 20 parts of methylene-bis-(caprolactam) instead of 10 parts. These polyamides are soluble in organic solvents, for example 80% alcohol. They may therefore be worked up from the solution of the mixed polyamides without addition. For example they can be used with special advantage for the production of impregnations, finishes or foils.

*Example 11*

500 parts of adipic acid salt of hexamethylene diamine, 500 parts of water and 7.5 parts of the methylene-bis-(caprolactam) specified in Example 7 are polycondensed in the manner described in Example 7. An opaque white product is obtained.

*Example 12*

100 parts of caprylic lactam, 2 parts of water and 2 parts of the methylene-bis-(caprolactam) specified in Example 7 are condensed in the manner described in Example 8. A white opaque polycondensate results.

*Example 13*

100 parts of the dilactam obtained by Beckmann rearrangement from the dioxime of 1.1′-di-(2-keto-cyclohexyl)-dimethyl ether and 5 parts of water are heated at 270° C. for 8 hours while excluding oxygen. The polyamide formed is a transparent tough mass which when heated becomes plastic and finally rubber-elastic. The polyamide may be worked up by cutting operations or may be pressed and rolled when hot.

*Example 14*

100 parts of epsilon-caprolactam, 67 parts of water and 1 part of the dilactam specified in Example 13 are heated to 270° C. in a stainless steel autoclave with exclusion of oxygen. The pressure is kept at 16 atmospheres by decompression. As soon as 270° C. has been reached, it is slowly decompressed to atmospheric pressure and the condensation completed by a further 3 hours at 270° C. The viscous melt can be extruded as wire, threads or in the form of band-like structures which are capable of being stretched. The wet breaking strength is increased as compared with polyamides without additions. The molten viscosity and wet breaking strength are still further considerably increased by using 2 or 3 parts of the said dilactam in the condensation instead of 1 part.

*Example 15*

100 parts of methylene-bis-(caprolactam), 5 parts of adipic acid salt of hexamethylene diamine and 300 parts of orthohydroxydiphenyl are heated for 10 hours at 260° C. in a stainless steel vessel in an atmosphere free from oxygen. A tough, viscous polyamide solution is formed. The solvent is removed with methanol.

*Example 16*

100 parts of caprolactam, 5 parts of adipic acid salt of hexamethylene diamine, 40 parts of the dilactam obtained according to Example 2 and 250 parts of paracresol are heated for 12 hours at 250° C. in an atmosphere free from oxygen. After distilling off the solvent in vacuo, a tough polyamide with a wide softening range remains behind.

*Example 17*

20 parts of adipic acid salt of hexamethylene diamine, 80 parts of methylene-bis-(caprolactam) and 300 parts of orthohydroxydiphenyl are heated for 8 hours at 280° C. in an atmosphere free from oxygen. By treating the viscous solution with ethyl acetate, the thermoplastic polyamide is isolated.

We claim:

1. A polyamide of high thermal elasticity which is a polycondensate obtained by the polycondensation reaction at 120–300° C. for 3–12 hours in an oxygen-free atmosphere of (a) a member from the group consisting of a mixture of an aliphatic diamine having 2–12 carbons and an aliphatic dicarboxylic acid having 4–20 carbons, a salt of an aliphatic diamine having 2–12 carbons and an aliphatic dicarboxylic acid having 4–20 carbons, the adipic acid salt of diaminodicyclohexamethane, omega-amino-caproic acid, the hydrochloride of omega-amino-caproic acid, omega-amino-oenanthic acid, omega-amino-undecanic acid, pyrrolidone, epsilon-caprolactam, oenanthic caprolactam, caprylic lactam, and mixtures thereof and (b) a mixture of methylene-bis-lactam isomers, the isomeric components of which mixture have the formulae:

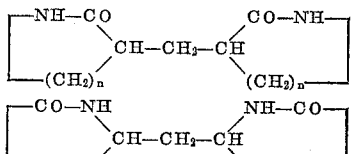

and

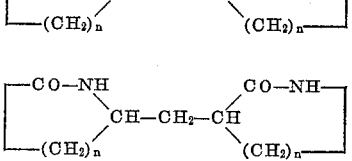

wherein $n$ is an integer in the range of 4–6, inclusive.

2. A polyamide of high thermal elasticity which is a polycondensate obtained by the polycondensation reaction at 120–300° C. for 3–12 hours in an oxygen-free atmosphere of (a) e-caprolactam and (b) a mixture of methylene-bis-lactam isomers, the isomeric components of which mixture have the formulae:

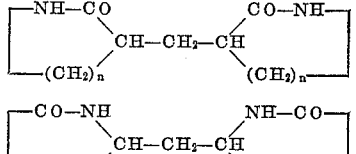

and

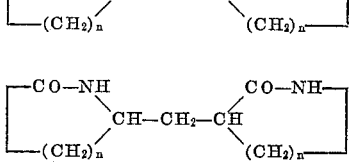

wherein $n$ is an integer in the range of 4–6, inclusive.

3. A polyamide of high thermal elasticity which is a polycondensate obtained by the polycondensation reaction at 120–300° C. for 3–12 hours in an oxygen-free atmosphere of (a) adipic acid and hexamethylene diamine and (b) a mixture of methylene-bis-lactam isomers, the isomeric components of which mixture have the formulae:

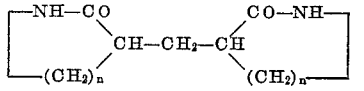

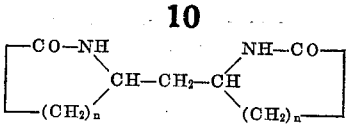

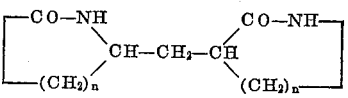

wherein $n$ is an integer in the range of 4–6, inclusive.

4. A polyamide of high thermal elasticity which is a polycondensate obtained by the polycondensation reaction at 120–300° C. for 3–12 hours in an oxygen-free atmosphere of (a) caprylic lactam and (b) a mixture of methylene-bis-lactam isomers, the isomeric components of which mixture have the formulae:

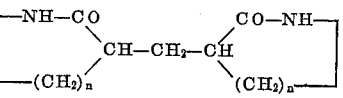

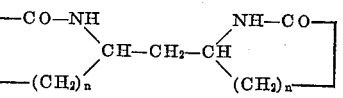

and

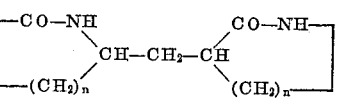

wherein $n$ is an integer in the range of 4–6, inclusive.

5. A mixture of bis-lactam isomers, the isomeric components of which mixture are of the formulae:

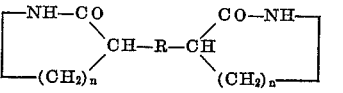

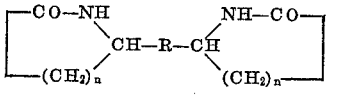

and

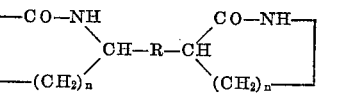

wherein R is a divalent radical selected from the group consisting of

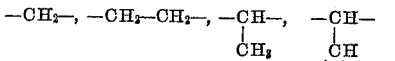
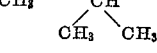
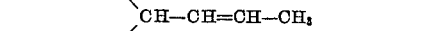
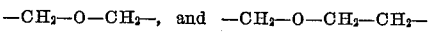

and wherein $n$ is an integer in the range of 4–6, inclusive.

6. A mixture of methylene-bis-lactam isomers, the components of which are of the formulae:

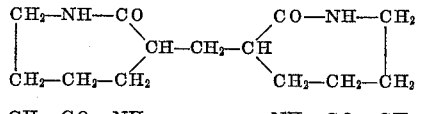

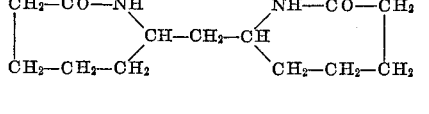

and

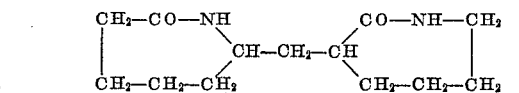

7. A mixture of bis-lactam isomers, the components of which are of the formulae:

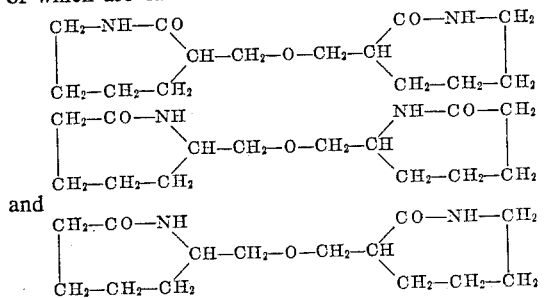

and

References Cited in the file of this patent

UNITED STATES PATENTS 2,221,369    Cass ------------------ Nov. 12, 1940

FOREIGN PATENTS 723,594    Great Britain ------------ Feb. 9, 1955
742,479    Great Britain ---------- Dec. 30, 1955

OTHER REFERENCES

Colonge: Bull. Soc. Chim. France (1955), pp. 250–255.
Colonge et al.: Bull. Soc. Chim. de France (1956), pp. 1635–1640.
Chem. and Ind., 1956, page 1314.
Lyle: J. of Organic Chem., vol. 20, page 623 (1955).
Marvel et al: Organic Synthesis (Blatt) Collective, vol. II, pp. 371–372, John Wiley and Sons, Inc., New York, 1943.
Surrey: Name Reactions in Organic Chemistry, pages 9–10, Academic Press Inc., Publishers, 1954, New York.
Fieser Organic Synthesis, vol. 17, p. 60 (1939), John Wiley & Sons Inc., London.